United States Patent
Vos et al.

(10) Patent No.: US 10,630,445 B2
(45) Date of Patent: Apr. 21, 2020

(54) METHODS AND APPARATUSES FOR PHASE ROTATION IN 2 SUB-CARRIER PI/2 BINARY PHASE SHIFT KEYING COMMUNICATION

(71) Applicant: SIERRA WIRELESS, INC., Richmond (CA)

(72) Inventors: Gustav Gerald Vos, Surrey (GB); Steven John Bennett, Coquitlam (CA)

(73) Assignee: SIERRA WIRELESS, INC., British Columbia (CA)

( * ) Notice: Subject to any disclaimer, the term of this patent is extended or adjusted under 35 U.S.C. 154(b) by 0 days.

(21) Appl. No.: 16/249,217

(22) Filed: Jan. 16, 2019

(65) Prior Publication Data
US 2019/0222447 A1    Jul. 18, 2019

Related U.S. Application Data

(60) Provisional application No. 62/617,878, filed on Jan. 16, 2018.

(51) Int. Cl.
*H04L 5/00* (2006.01)
*H04L 27/20* (2006.01)
(Continued)

(52) U.S. Cl.
CPC .......... *H04L 5/0051* (2013.01); *H04L 27/206* (2013.01); *H04L 27/2082* (2013.01);
(Continued)

(58) Field of Classification Search
CPC ............. H04L 27/2634; H04L 27/206; H04L 27/2082; H04L 27/2607; H04L 27/2636; H04L 27/3411; H04L 5/0051
See application file for complete search history.

(56) References Cited

U.S. PATENT DOCUMENTS 10,389,562 B2 *  8/2019  Zhang ................ H04L 27/2613
2010/0254475 A1 * 10/2010  Kawauchi ........... H04L 27/0014
                                                                    375/267
(Continued)

FOREIGN PATENT DOCUMENTS

WO    2013109350 A1    7/2013
WO    2019140519 A1    7/2019

OTHER PUBLICATIONS

3rd Generation Partnership Project (3GPP) document numbered 36.211, version 154.0, (Dec. 2018) Evolved Universal Terrestrial Radio Access (E-UTRA); Physical channels and modulation.
(Continued)

*Primary Examiner* — Sung S Ahn
(74) *Attorney, Agent, or Firm* — AEON Law, PLLC; Adam L. K. Philipp; Jonathan E. Olson

(57) ABSTRACT

The present invention provides methods and apparatuses for implementation of cyclic prefix (CP) and demodulation reference signal (DMRS) in 2 sub-carrier pi/2 binary phase shift keying (BPSK) modulation in a communication system. DMRS symbols are interleaved with data-carrying symbols and configured such that they are alternatingly transmitted on different ones of the two sub-carriers. When a DMRS symbol is transmitted on one sub-carrier, the other sub-carrier may be unused. In implementing CP, phase rotations may be applied to modulation symbols, such that each concurrently transmitted pair of symbols is subjected to a same phase rotation. The phase rotation can be derived based on an average frequency of the two (e.g. adjacent) sub-carriers in use. The phase rotations can be updated recursively, and the update multiplied by a scaling factor.

20 Claims, 16 Drawing Sheets

(51) Int. Cl.
  *H04L 27/26* (2006.01)
  *H04L 27/34* (2006.01)
(52) U.S. Cl.
  CPC ........ *H04L 27/261* (2013.01); *H04L 27/2607* (2013.01); *H04L 27/2636* (2013.01); *H04L 27/3411* (2013.01)

(56) References Cited

U.S. PATENT DOCUMENTS

| | | |
|---|---|---|
| 2011/0228878 A1 | 9/2011 | Sorrentino |
| 2016/0301452 A1* | 10/2016 | Kwon .................. H04B 7/0421 |
| 2017/0230213 A1 | 8/2017 | Wang et al. |
| 2019/0089504 A1 | 3/2019 | Hwang et al. |
| 2019/0149381 A1 | 5/2019 | Vos |
| 2019/0158339 A1 | 5/2019 | Park et al. |
| 2019/0222388 A1 | 7/2019 | Vos et al. |
| 2019/0356526 A1 | 11/2019 | Kuchi |

OTHER PUBLICATIONS

ETSI TS 136 211 V14.4.0 (Oct. 2017), LTE; Evolved Universal Terrestrial Radio Access (E-UTRA); Physical channels and modifications (3GPP TS 36.211 version 14.4.0 Release 14.

Office Action dated Feb. 4, 2020 for corresponding U.S. Pat. No. 2019/0222388.

* cited by examiner

METHODS AND APPARATUSES FOR PHASE ROTATION IN 2 SUB-CARRIER PI/2 BINARY PHASE SHIFT KEYING COMMUNICATION

CROSS-REFERENCE TO RELATED APPLICATION

The present application claims priority from U.S. Provisional Patent Application No. 62/617,878, filed on Jan. 16, 2018, and which is incorporated herein by reference in its entirety.

FIELD OF THE INVENTION

The present invention pertains to the field of telecommunication and in particular to methods and apparatuses for implementation of demodulation reference signals (DMRS), phase rotation with regard to cyclic prefixes (CP), or both, in 2 sub-carrier Pi/2 binary phase shift keying (BPSK) modulation in a communication system.

BACKGROUND

For enhanced Machine-Type Communication (eMTC) technologies under consideration by the $3^{rd}$ Generation Partnership Project (3GPP), a 2 sub-carrier Pi/2 binary phase shift keying (BPSK) signaling mechanism has been agreed upon for eMTC 3GPP Release 15.

Pi/2 BPSK refers to a variation of BPSK modulation in which two different BPSK symbol constellations are alternatingly used to modulate data. The second constellation can be derived by rotating the first constellation by Pi/2 radians. 2 sub-carrier Pi/2 BPSK refers to an approach in which two different sub-carriers (e.g. out of a possible 12 sub-carriers in an LTE physical resource block) are used to transmit the data prepared in part using Pi/2 BPSK. Data is thus transmitted via only two out of the twelve subcarriers at a time. An input data stream can be multiplexed into two streams, which are processed together to drive the two sub-carriers.

To support technologies such as eMTC, there is a need for methods and apparatuses for further developments in the implementation of such 2 sub-carrier Pi/2 binary phase shift keying (BPSK) modulation in a communication system.

This background information is provided to reveal information believed by the applicant to be of possible relevance to the present invention. No admission is necessarily intended, nor should be construed, that any of the preceding information constitutes prior art against the present invention.

SUMMARY

An object of the present invention is to provide methods and apparatuses for implementation of cyclic prefixes (CP), demodulation reference signals (DMRS), or both, in 2 sub-carrier Pi/2 binary phase shift keying (BPSK) modulation in a communication system. Such aspects may be performed for example by a mobile device (UE) for wireless uplink communication in an implementation of a communication protocol such as LTE.

In accordance with an aspect of the present invention, there is provided a method for implementing demodulation reference signal symbols in 2 sub-carrier Pi/2 binary phase shift keying modulation in a communication system, the method comprising inserting DMRS data before Pi/2 BPSK modulation. In accordance with another aspect of the present invention, there is provided a method for implementing a demodulation reference signal in 2 sub-carrier Pi/2 binary phase shift keying modulation in a communication system, the method comprising inserting DMRS pi/2 BSPK modulated symbols before FFT and phase rotation of data. In accordance with another aspect of the present invention, there is provided a method for implementing a demodulation reference signals in 2 sub-carrier Pi/2 binary phase shift keying modulation in a communication system, the method comprising inserting DMRS pi/2 BSPK modulated symbols after FFT and before phase rotation of data.

In accordance with an aspect of the present invention, there is provided a method for including a plurality of demodulation reference signal (DMRS) symbols in a physical resource block format in a communication system, the method comprising: converting input data into modulation symbols, the converting comprising performing Pi/2 binary phase shift keying (BPSK) modulation on the input data; and transmitting a combination of the modulation symbols and the plurality of DMRS symbols using a pair of sub-carriers of the physical resource block format, wherein subsequent ones of the plurality of DMRS symbols are alternatingly transmitted on different ones of the pair of sub-carriers.

In accordance with an aspect of the present invention, there is provided an electronic wireless communication apparatus for including a plurality of demodulation reference signal (DMRS) symbols in a physical resource block format in a communication system, the apparatus comprising circuitry configured to: convert input data into modulation symbols, the converting comprising performing Pi/2 binary phase shift keying (BPSK) modulation on the input data; and transmit a combination of the modulation symbols and the plurality of DMRS symbols using a pair of sub-carriers of the physical resource block format, wherein subsequent ones of the plurality of DMRS symbols are alternatingly transmitted on different ones of the pair of sub-carriers.

In accordance with another aspect of the present invention, there is provided a method for implementing a cyclic prefix in 2 sub-carrier Pi/2 binary phase shift keying modulation in a communication system, the method comprising applying phase rotations to modulation symbols transmitted on two different sub-carriers, such that the phase rotations applied to modulation symbols transmitted on a first sub-carrier are the same as the phase rotations applied to modulation symbols transmitted on a second sub-carrier. The same phase rotations can be generated based at least in part on an average frequency of the two sub-carriers, which may be adjacent sub-carriers in a PRB, and which may be the only two sub-carriers used at a given time by a transmitting apparatus. That is, additional sub-carriers of the PRB may be unused (by the present method and apparatus) for transmission.

In accordance with another aspect of the present invention, there is provided a method for transmitting symbols in a physical resource block format in a communication system, the method comprising: converting input data into modulation symbols, the converting comprising performing Pi/2 binary phase shift keying (BPSK) modulation on the input data; performing a discrete Fourier transform pairwise on the modulation symbols, or on the modulation symbols combined with additional modulation symbols; performing a phase rotation operation on symbols output by the discrete Fourier transform; optionally performing tone (k) modulation pairwise on phase rotated symbols output by the phase rotation operation in order to map respective ones of each pair of phase rotated symbols to respective ones of the pair of sub-carriers; adding cyclic prefixes to symbols output by the tone (k) modulation (where performed) to generate a plurality of prefixed symbols; and transmitting the prefixed symbols using a pair of sub-carriers of the physical resource block format, wherein the phase rotation operation comprises applying a same phase rotation to pairs of symbols that will be transmitted concurrently on each one of the pair of sub-carriers.

In accordance with an aspect of the present invention, there is provided an electronic wireless communication apparatus for transmitting symbols in a physical resource block format in a communication system, the apparatus comprising circuitry configured to: convert input data into modulation symbols, the converting comprising performing Pi/2 binary phase shift keying (BPSK) modulation on the input data; perform a discrete Fourier transform pairwise on the modulation symbols, or on the modulation symbols combined with additional modulation symbols; perform a phase rotation operation on symbols output by the discrete Fourier transform; optionally perform tone (k) modulation pairwise on phase rotated symbols output by the phase rotation operation in order to map respective ones of each pair of phase rotated symbols to respective ones of the pair of sub-carriers; add cyclic prefixes to symbols output by the tone (k) modulation (where performed) to generate a plurality of prefixed symbols; and transmit the prefixed symbols using a pair of sub-carriers of the physical resource block format, wherein the phase rotation operation comprises applying a same phase rotation to pairs of symbols that will be transmitted concurrently on each one of the pair of sub-carriers.

BRIEF DESCRIPTION OF THE FIGURES

These and other features of the invention will become more apparent in the following detailed description in which reference is made to the appended drawings.

DETAILED DESCRIPTION

Embodiments of the present invention provide methods and apparatuses for implementation of demodulation reference signal symbols (DMRS) in 2 sub-carrier Pi/2 binary phase shift keying (BPSK) modulation in a communication system.

Embodiments of the present invention provide methods and apparatuses for implementation of symbol phase rotations and cyclic prefixes, in 2 sub-carrier Pi/2 binary phase shift keying (BPSK) modulation in a communication system.

Pi/2 BPSK modulation is described for example in U.S. Patent Application No. 62/586,432, which is incorporated herein by reference. Pi/2 BPSK modulation, DMRS insertion, phase rotations and cyclic prefixes are also described in the $3^{rd}$ Generation Partnership Project (3GPP) document numbered 36.211, version 15.4.0, and entitled Evolved Universal Terrestrial Radio Access (E-UTRA); Physical channels and modulation, which is incorporated herein by reference and referred to herein as TS 36.211.

Figure 1:
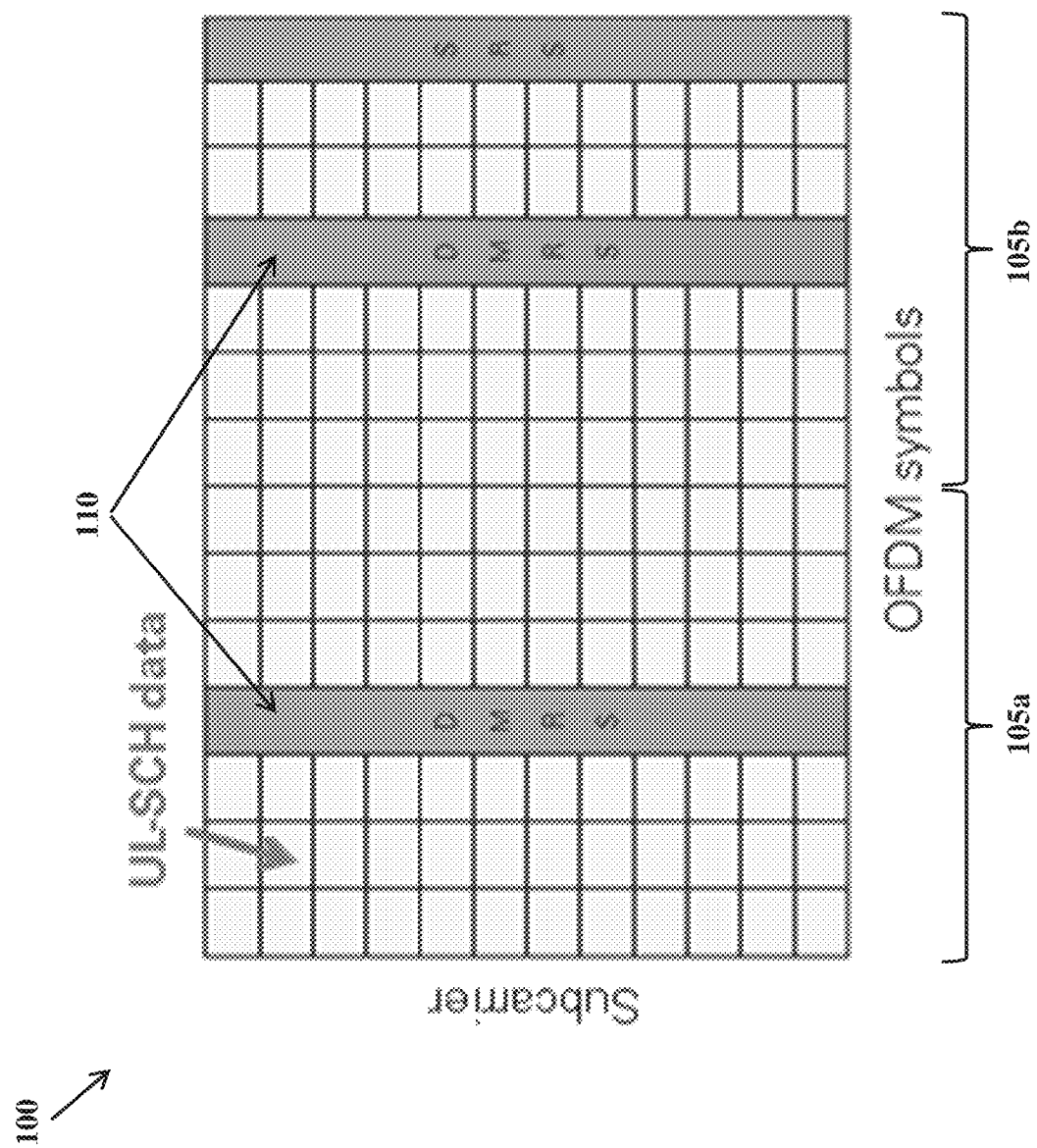
FIG. 1 illustrates DMRS transmission for legacy LTE systems.

The DMRS (Demodulation Reference Signal) facilitates coherent demodulation associated with transmission of data on a physical uplink shared channel (PUSCH). DMRS is transmitted in the fourth single-carrier frequency division multiple access (SC-FDMA) symbol of the slot and is the same size as the assigned resource (i.e. sent on symbol 3 and 10 of every SF). An example is illustrated in FIG. 1. For legacy Long-term Evolution (LTE) and for Narrowband Internet of Things (NB-IoT) when the number of subcarriers is greater than one, the DMRS is a type of Zadoff-Chu (ZC) Sequence. A problem is that if a ZC is used for the DMRS for the 2 subcarrier Pi/2 BPSK modulation then the peak to average power ratio (PAPR) for those DMRS symbols may not be in a desirable range. The presence of such DMRS symbols may degrade the PAPR benefit derived from using 2 sub-carrier Pi/2 binary phase shift keying (BPSK) modulation.

Referring to FIG. 1, DMRS symbols are included at locations 110 of an LTE subframe 100 comprising a pair of physical resource blocks (PRBs) 105a, 105b. The subframe 100 is formed of multiple resource elements conveyed via different subcarriers (vertical axis) and different OFDM symbols occurring sequentially in time (horizontal axis).

According to embodiments of the present invention, the DMRS symbols are Pi/2 BPSK modulated. Pi/2 phase rotation of the DMRS is synchronized with data (i.e. the alternating pi/2 phase shift is maintained). Furthermore, the DMRS is transmitted on only 1 sub-carrier at a time, with such transmission alternating between the 2 sub-carriers. An example is illustrated in FIG. 2.

Figure 2:
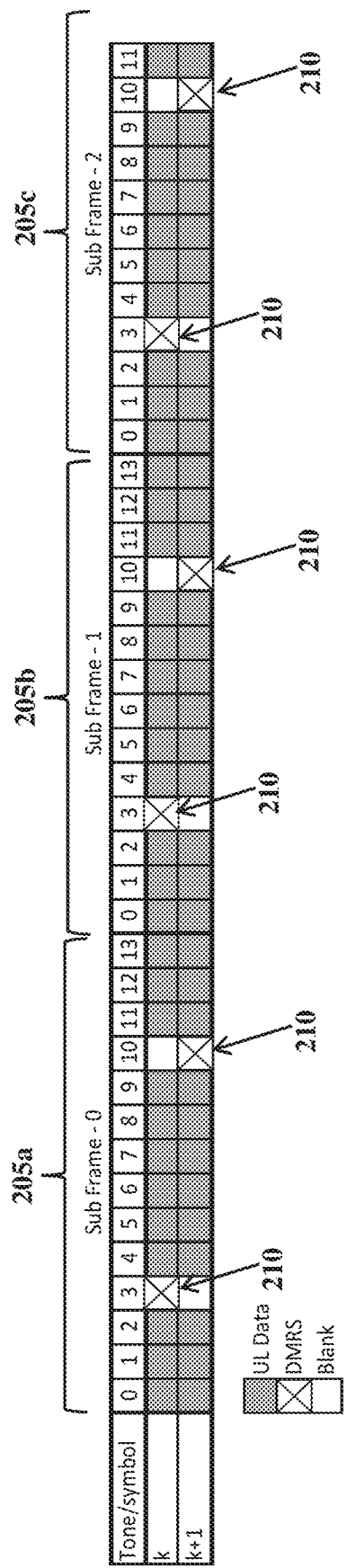
FIG. 2 illustrates DMRS only on 1 sub-carrier at a time on alternating between 2 sub-carriers according to embodiments of the present invention.

Referring to FIG. 2, portions of three consecutive subframes 205a, 205b, 205c are shown. As in FIG. 1, DMRS 210 are transmitted using the fourth OFDM symbols of each PRB, which correspond to the numbered symbols 3 and 10 in FIG. 2. The symbol numbers count, from 0 to 14, the consecutive (in time) OFDM symbols of the current subframe. Furthermore, the tone used to transmit DMRS is alternated between tone k and tone k+1. That is, for the first PRB of each subframe, tone k is used to transmit DMRS (in symbol 3) and tone k+1 is unused. For the second PRB of each subframe, tone k+1 is used to transmit DMRS (in symbol 10) and tone k is unused. Notably, both tones k and k+1 are also used for other purposes, such as transmitting uplink data and SRS.

For greater clarity, tone k and tone k+1 can be mapped to two different sub-carriers of the subframes and PRBs. The two sub-carriers may be adjacent to one another and may be the only two sub-carriers presently used by a given apparatus for transmission. For LTE and similar systems, the sub-carriers may have 15 kHz bandwidth, with a full PRB composed of about 12 sub-carriers. However, in certain applications, such as the 2 sub-carrier BPSK, a given uplink or downlink transmission does not necessarily use all sub-carriers. As such, modulation symbols representing data are transmitted using a pair of tones k and k+1 at OFDM symbols 0 to 2, 4 to 9 and 11 to 12, with the two tones mapped to two sub-carriers of the PRB format. In combination with this, DMRS symbols are transmitted using the same pair of tones k and k+1 at OFDM symbols 4 and 10, with the tones mapped to the same sub-carriers. Further, subsequent ones of the plurality of DMRS symbols are alternatingly transmitted on different ones of the pair of sub-carriers. That is, first, third, etc. DMRS symbols are transmitted via one sub-carrier (corresponding to tone k), whereas second, fourth, etc. DMRS symbols are transmitted via the other sub-carrier (corresponding to tone k+1).

In various embodiments, and as shown in FIG. 2, when one of the pair of sub-carriers is used to transmit one of the plurality of DMRS symbols, the other one of the pair of sub-carriers is unused for transmitting another one of the plurality of DMRS symbols. In various embodiments, and as shown in FIG. 2, when one of the pair of sub-carriers is used to transmit one of the plurality of DMRS symbols, the other one of the pair of sub-carriers is unused for transmission.

According to embodiments, even though the DMRS is sent ½ as often per subcarrier (because tone k+1 is unused when tone k is used for DMRS and vice-versa), the PSD of the DMRS can be double so the channel estimate and the DMRS for tone k can be used for tone k+1 and visa-versa and thus the resulting block error rate (BLER) performance should be similar to if not better, for lower Doppler rates. At higher Doppler rates, there could be a minor reduction in performance but this should be very small as the subcarriers are adjacent (i.e. only 15 kHz apart) and frequency selective fading at less than 15 kHz (i.e. coherent bandwidth) is uncommon for indoor environments. The two-subcarrier modulation optimization is designed for use cases of extended coverage (i.e. high MCL) caused mainly by in-building penetration where mobility beyond pedestrian is very unlikely. Given the DMRS are still sent at a frequency of about 1 kHz (once per SF) per sub-carrier, Doppler rates of 200 Hz (i.e. 72 km/H at 1.5 GHz carrier frequency) are not expected to see any significant degradation in BLER performance. In general, the coherent bandwidth is about equal to 1/(delay spread) so as long as the delay spread is <50 microseconds (1/50 kHz) little to no degradation is expected. For indoor and micro-cellular channels, the delay spread rarely exceeds a few hundred nanoseconds. Even for in macro-cellular channels beyond 8 microseconds is considered unusual in present applications. For this reason, the LTE downlink pilots (CRS) are sent, in various embodiments, only once every 3 sub-carriers.

According to embodiments, there are several methods which can be implemented in order to provide the above solution. This solution may generally comprise transmitting a combination of modulation symbols and DMRS symbols using a pair of sub-carriers of a physical resource block format, where subsequent ones of the plurality of DMRS symbols are alternatingly transmitted on different ones of the pair of sub-carriers. More particularly, in various embodiments, only two sub-carriers are used at a time for transmission, thus only using two out of twelve sub-carriers of a PRB format at a time. The two sub-carriers may be adjacent to each other. For example, when two out of a possible three (e.g. contiguous) sub-carriers are usable for transmission, two adjacent ones of the sub-carriers are selected and used for transmission. First, second and third implementation methods are discussed below.

According to some embodiments, the first implementation method includes inserting DMRS data before Pi/2 BPSK modulation. DMRS data is encoded to ensure that the DMRS symbols are transmitted on alternating sub-carriers.

Figure 3:
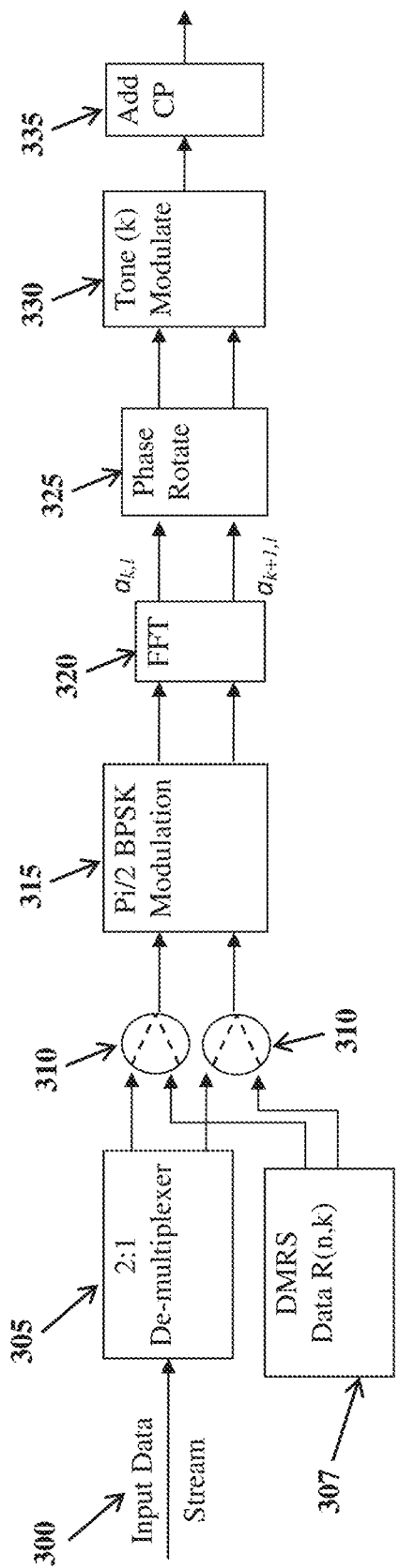
FIG. 3 illustrates a method of inserting DMRS data before Pi/2 BPSK modulation according to embodiments of the present invention.

FIG. 3 illustrates the first implementation method according to some embodiments. An input data stream 300 is input to a de-multiplexer 305 which produces two data streams. A DMRS source 307 produces DMRS data sequences for each tone. The DMRS data sequences may be provided as binary data, and may be referred to as DMRS symbol precursor data. Interleavers (multiplexers) 310 combine the outputs of the de-multiplexer 305 with the DMRS data sequences in a manner that will result in the DMRS symbols being disposed at appropriate locations (symbol locations 3 and 10 as in FIG. 2) in the subsequent transmitted subframes. In other words, the precursor data is configured and introduced so that subsequent modulation thereof, including the Pi/2 BPSK modulation, results in the resultant DMRS symbols being presented for alternating transmission on different ones of the pair of sub-carriers. The interleavers create interleaved data.

The output of the interleavers 310 is provided to a modulator 315 which performs Pi/2 BPSK modulation on the interleaved data. Two bits may be modulated at a time (i.e. in parallel) to produce two symbols according to BPSK symbol constellation(s). The BPSK symbol constellation(s) may be rotated by ±Pi/2 radians after conversion of each pair of bits. Each one of the pair of bits may be modulated using a same BPSK symbol constellation, or different ones of the pair of bits may be modulated using different (e.g. rotated by Pi/2 radians relative to one another) BPSK symbol constellations.

Pairs of symbols output by the modulator 315 are subject to a FFT (or DFT) operation 320. The operation 320 outputs a pair of symbols which corresponds to a discrete Fourier transform of the input symbols. Pairs of symbols output by operation 320 may be subject (e.g. pairwise) to a phase rotation operation 325. The phase rotation operation may be as described elsewhere herein. Generally, the phase rotation operation may adjust the phase of modulation symbols by a given amount. In some embodiments, both symbols of each pair are subjected to the same amount of phase rotation, which may be generated based on an average frequency of the two sub-carriers subsequently used for their transmission. The sub-carriers are selected in the operation 330 below, and data from the operation 330 may be fed back to the operation 325.

Pairs of symbols output of the phase rotation operation 325 (when present) are subject to a Tone (k) modulation operation 330. The operation 330 may comprise sub-carrier mapping, in which tones k and k+1 are mapped to two (typically adjacent) sub-carrier frequencies of the PRB configuration. The operation 330 may be fixed and inherent in the definition of the tones. The operation 330 may be configurable and performed on generalized tones. The operation 330 may map respective ones of each pair of phase rotated symbols to respective ones of the pair of sub-carriers. The operation 330 may map one symbol of an input pair of symbols to a particular sub-carrier, and maps the other symbol of the input pair to another sub-carrier. The mapping is performed according to a predetermined mapping rule.

A cyclic prefix operation 335 may add cyclic prefixes to symbols output of the Tone (k) modulation operation 330. Alternatively, cyclic prefixes can be added in another manner Other operations (not shown) can also be performed, as would be readily understood by the worker skilled in the art, such as digital-to-analog conversion, transmit filtering (e.g. Nyquist reconstruction), radiofrequency (RF) upconversion, additional filtering of harmonics, and power amplification.

For the first implementation, the DMRS data sequence R(n,k) needs to be encoded to make sure the DMRS output symbols $a_{k,l}$ and $a_{k+1,l}$ are alternating sub-carriers. If R(n,k)=R(n,k+1) then subcarrier $a_{k,l}$ will be transmitted—this is because FFT (X, X)=[2X 0]. If R(n,k)=−R(n,k+1) then subcarrier $a_{k+1,l}$ will be transmitted—this is because FFT (X, −X)=[0 2X]. For example, the following method could be used to ensure alternating DMRS output symbols:

$$\begin{aligned} R(n, k) &= w(n)(1 - 2c(n)) & k \text{ is even} & \quad \text{Or:} \\ &= w(n)(1 - 2c(n)) & k \text{ is odd}, n \text{ is even} \\ &= -w(n)(1 - 2c(n)) & k \text{ is odd}, n \text{ is odd} \end{aligned} \quad (1)$$

$$\begin{aligned} R(n, k) &= w(n)(1 - 2c(n)) & k \text{ is even} \\ &= w(n)(1 - 2c(n)) & k \text{ is odd}, n \text{ is odd} \\ &= -w(n)(1 - 2c(n)) & k \text{ is odd}, n \text{ is even} \end{aligned} \quad (2)$$

In the first implementation, R(n,k) denotes binary precursor data that is used to generate appropriate DMRS symbols. Element k is an index over sub-carriers or tones. Element n is an index over bits in the DMRS data sequence. Element l is an index over symbols, and bits n are mapped to symbols l via modulation (e.g. with successive bits mapped to successive symbols). Further, in the above, w represents a Hadamard code having elements w(n), and c represents a Gold sequence having elements c(n). However, w and c may represent other, substantially equivalent values.

According to embodiments, to obtain orthogonal patterns, a similar concatenated Hadamard code w(n) and Gold sequence c(n) could be used (same as single sub-carrier for NB-IoT).

According to embodiments, a potential advantage of the first implementation method is that the Pi/2 phase shift is done in one place so synchronization of the pi/2 phase shift is easy. For example, a single component can be used to modulate both input data and the DMRS data sequence.

According to some embodiments, the second implementation method includes inserting DMRS Pi/2 BSPK modulated symbols before FFT and phase rotation of data and DMRS needs to be synchronized.

Although fast Fourier transforms (FFT) are used in the present description, it should be noted that the FFT may be replaced with another type of discrete Fourier transform (DFT). The Fourier transform can be implemented numerically, using appropriately configured circuitry, or via an equivalent operation such as a look-up table, as would be readily understood by a worker skilled in the art.

Figure 4:
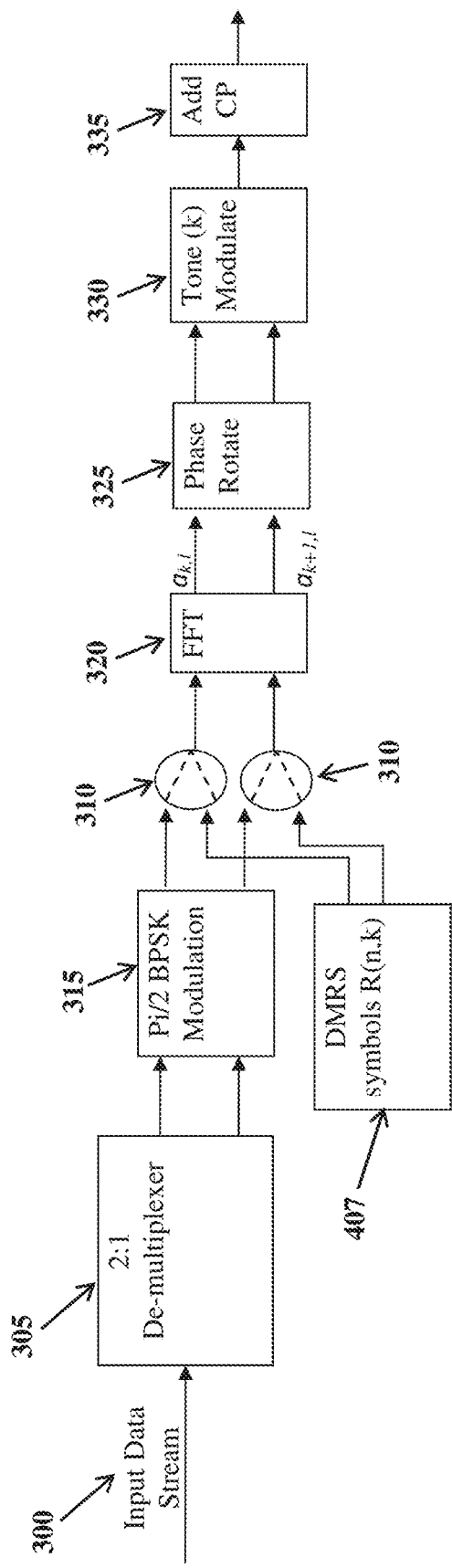
FIG. 4 illustrates a method of inserting DMRS pi/2 BSPK modulated symbols before FFT and phase rotation of data according to embodiments of the present invention.

FIG. 4 illustrates the second implementation method in accordance to some embodiments of the present invention. FIG. 4 includes many of the same components as FIG. 3, but in a different order. Further, DMRS source 307 is replaced with DMRS source 407 which produces DMRS symbols rather than precursor data. The interleavers 310 are placed after the Pi/2 BPSK modulator 315 and interleave the BPSK modulated symbols with the DMRS symbols to produce interleaved output. Output of the interleavers 310 is provided to the FFT operation 320. Therefore, in contrast with FIG. 3, interleaving is performed after BPSK modulation, and appropriate DMRS symbols are interleaved with the data symbols in a manner which causes the DMRS symbols to be transmitted by the appropriate tone (e.g. alternating between tones k and k+1) at the appropriate time (e.g. at symbol locations 3 and 10 in a given subframe). The DMRS symbols are generated so that subsequent handling thereof results in the plurality of DMRS symbols being presented for alternating transmission on the different ones of the pair of sub-carriers. The DMRS symbols may be generated such that the interleaved output comprises a consistent pattern of alternating Pi/2 phase shifts between successive symbols. As illustrated, the subsequent handling may include some or all of: performing a FFT operation 320 (or other discrete Fourier transform) on the interleaved output; performing a phase rotation operation 325 on output of the discrete Fourier transform; and performing tone (k) modulation 330 pairwise on phase rotated symbols output by the phase rotation operation, in order to map respective ones of each pair of phase rotated symbols to respective ones of the pair of sub-carriers.

In the second implementation, the DMRS sequence R(n, k) is encoded in a manner which causes the output $a_{k,l}$ and $a_{k+1,l}$ to be alternating. (In the second and third implementation, R(n,k) denotes symbols, rather than precursor binary data). Based on the subsequent operations, it is possible to generate such a DMRS sequence. For example, for following method could be used:

$$\begin{aligned} R(n, k) &= \bar{r}_u(n) & k \text{ is even} \\ &= \bar{r}_u(n) & k \text{ is odd}, n \text{ is even} \\ &= -\bar{r}_u(n) & k \text{ is odd}, n \text{ is odd} \end{aligned} \quad (3)$$

Where $\bar{r}_u(n)$ is the same as in 1 subcarrier NB-IoT:

$$\bar{r}_u(n) = \frac{1}{\sqrt{2}}(1 + j)(1 - 2c(n))w(n \bmod 16), \quad (4)$$
$$0 \le n < M_{rep}^{NPUSCH} N_{slots}^{UL} N_{RU}$$

According to embodiments, to get orthogonal patterns, a similar concatenated Hadamard code w(n) and Gold sequence c(n) can be used (same as 1 sub-carrier for NB-IoT).

According to embodiments, the Pi/2 phase shifts are done in two places which need to be coordinated to make sure the final sequence has an alternating pi/2 phase shift. The two places correspond to phase shifts applied when modulating the input data, and phase shifts applied when generating the DMRS. For example, if the initial data at symbol 0 is not Pi/2 rotated, then the DMRS at symbol 3 should be Pi/2 rotated but the DMRS sent at symbol 10 should not be Pi/2 rotated.

According to some embodiments, the third implementation method includes inserting DMRS Pi/2 BSPK modulated symbols after FFT, and for example before phase rotation of data. Furthermore, Pi/2 phase rotation of both the data and the DMRS may be synchronized. The synchronization is such that the Pi/2 phase rotation characteristic of Pi/2 BPSK is present in substantially the same form in the symbol stream comprising both modulated data symbols and DMRS.

Figure 5:
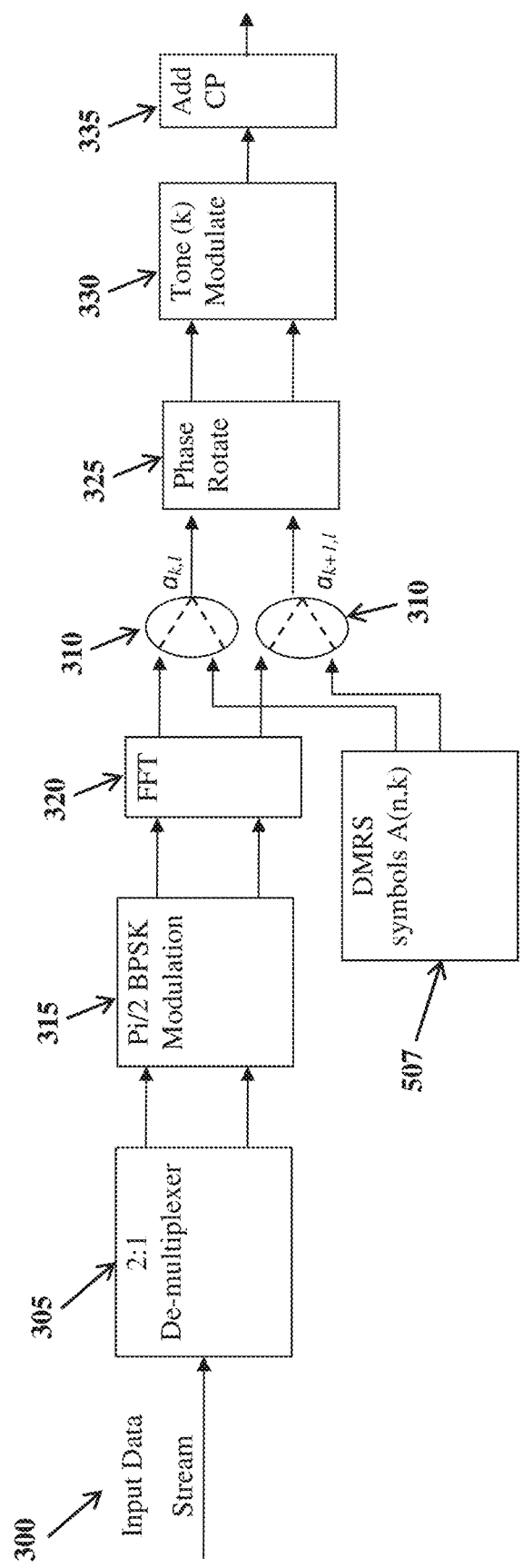
FIG. 5 illustrates a method of inserting DMRS pi/2 BSPK modulated symbols after FFT and before phase rotation of data according to embodiments of the present invention.

FIG. 5 illustrates the third implementation method in accordance to some embodiments of the present invention. FIG. 5 includes many of the same components as FIGS. 3 and 4, but in a different order. Further, DMRS source 307, 407 is replaced with DMRS source 507 which produces DMRS symbols. The interleavers 310 are placed after the FFT transformer 320 and interleave the BPSK modulated and FFT transformed symbols with the DMRS symbols to produce interleaved output. Output of the interleavers 310 is provided to the phase rotation operation 325, if present. Therefore, in contrast with FIGS. 3 and 4, interleaving is performed after FFT, and appropriate DMRS symbols are interleaved with the FFT-transformed data symbols in a manner which causes the DMRS symbols to be transmitted by the appropriate tone (e.g. alternating between tones k and k+1) at the appropriate time (e.g. at symbol locations 3 and 10 in a given subframe).

The DMRS symbols are generated (and interleaved) so that subsequent handling thereof results in the plurality of DMRS symbols being presented for alternating transmission on said different ones of the pair of sub-carriers. As illustrated, the subsequent handling can include, for example, one or both of: performing a phase rotation operation on the interleaved output; and performing tone (k) modulation pairwise on phase rotated symbols output by the phase rotation operation in order to map respective ones of each pair of phase rotated symbols to respective ones of the pair of sub-carriers.

In the third implementation, the DMRS symbol sequence A(n,k)) may further be encoded to cause the outputs $a_{k,l}$ and $a_{k+1,l}$ to be alternating. In other words, DMRS symbols are generated so that, after subsequent handling, the DMRS symbols are presented for alternating transmission on the two different sub-carriers. For example, for following method could be used:

$$A(n,k) = 2 * \bar{r}_u(n) \quad k \text{ is even, n is odd} \quad (5)$$
$$= 0 \quad k \text{ is even, } n \text{ is even}$$
$$= 0 \quad k \text{ is odd, } n \text{ is odd}$$
$$= 2 * \bar{r}_u(n) \quad k \text{ is odd, } n \text{ is even}$$

Where $\bar{r}_u(n)$ is the same as in 1 subcarrier NB-IoT modulation.

According to embodiments, in this method the Pi/2 phase shifts are done in two separate blocks which may be coordinated together. For example, if the initial data at symbol 0 is not rotated, then the DMRS at symbol 3 should be Pi/2 rotated but the DMRS sent at symbol 10 should not be Pi/2 rotated.

Embodiments of the present invention further provide methods and apparatuses for implementation of cyclic prefix (CP) in 2 sub-carrier Pi/2 binary phase shift keying (BPSK) modulation in a communication system.

In a situation including a sequence of symbols to be transmitted one after the other without a cyclic prefix (CP), the transitions from one symbol to the next would always have a phase discontinuity of plus or minus Pi/2. SC-FDMA as used in LTE requires a CP of a fixed length. This results in a phase shift between the end of the CP and the start of the next symbol that is not necessarily plus or minus Pi/2. The additional phase rotation depends on the frequency of the modulated tone, the phase shift at the symbol boundary is no longer always Pi/2. The actual resulting phase change can be between 0 and Pi. A transition of Pi transits the center of the complex plane, resulting in a larger power variation than a Pi/2 transition which causes an increase in PAPR. The increase in the PAPR may be more significantly affected by any excursions of power above the average. This happens when the digitally modulated signal is filtered, as is required in practical implementation to avoid generating sampling images in other Nyquist zones that will interfere with adjacent channels. The amount of overshoot of the trajectory of the filtered signal beyond its average raises the peak of the signal amplitude which defines a higher PAPR.

If the amount of the phase change between the end of the CP and the start of the next symbol can be known, an additional phase rotation can be introduced to correct the phase change to be Pi/2, or much closer to it. A scheme for doing so is a part of the NB-IoT standard for 1 sub-carrier Pi/2 BPSK, for example as described in Section 10.5.1 of TS 36.211.

Figure 6:
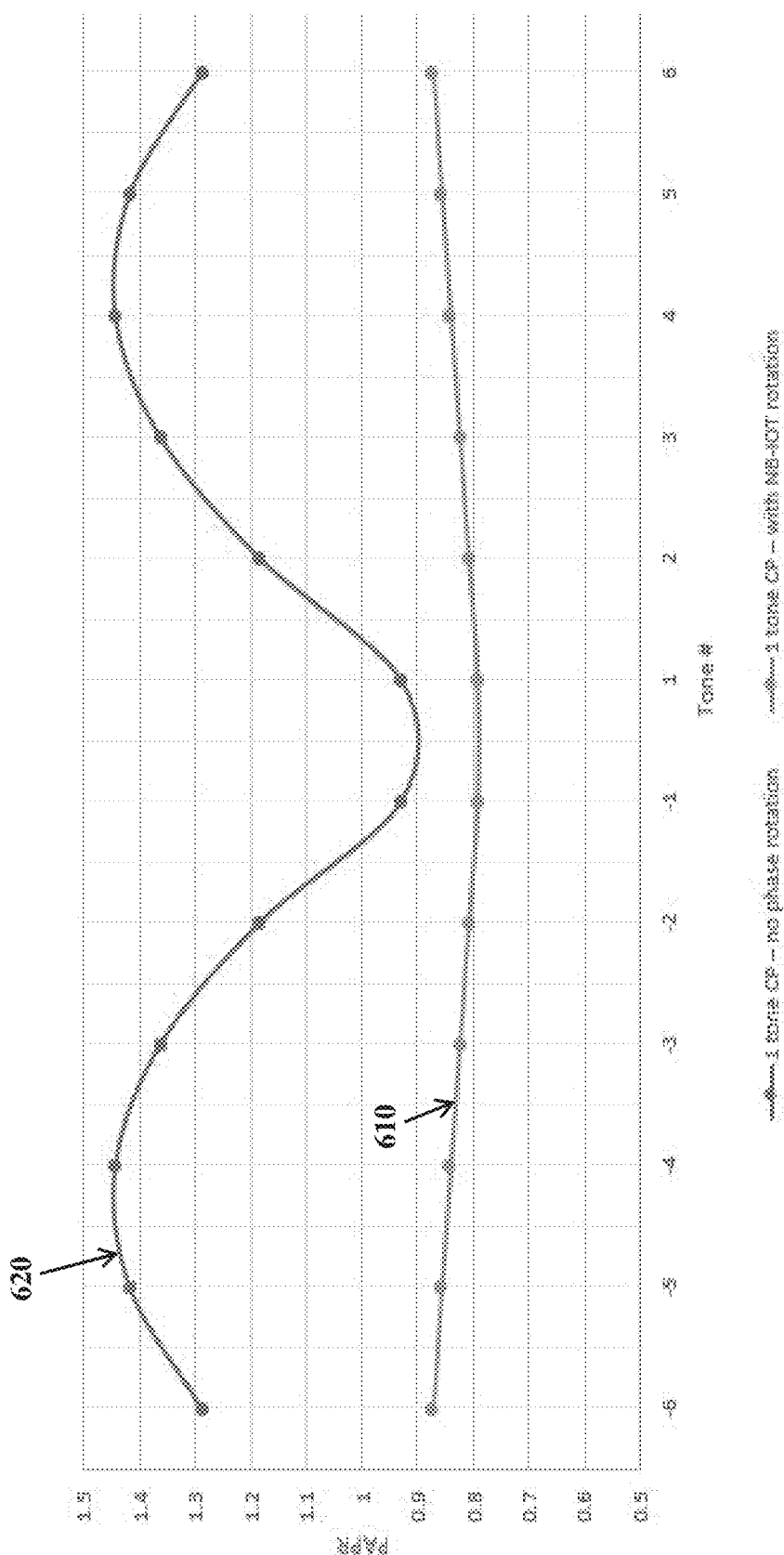
FIG. 6 illustrates PAPR with the CP added to a 1 Sub-carrier Pi/2 BPSK signal with and without phase rotation.

FIG. 6. Illustrates variation of PAPR (vertical axis) over each of 12 sub-carriers (horizontal axis) of a PRB, according to an illustrative example. Curve 610 illustrates variation of PAPR with the CP added to a 1 sub-carrier Pi/2 BPSK signal with the above-mentioned NB-IoT phase rotation. Curve 620 illustrates variation of PAPR with the CP added to a 1 sub-carrier Pi/2 BPSK signal, and without the above-mentioned NB-IoT phase rotation. As seen from FIG. 6, the phase rotation improves the PAPR for all 12 Sub-carriers of a PRB.

Figure 7:
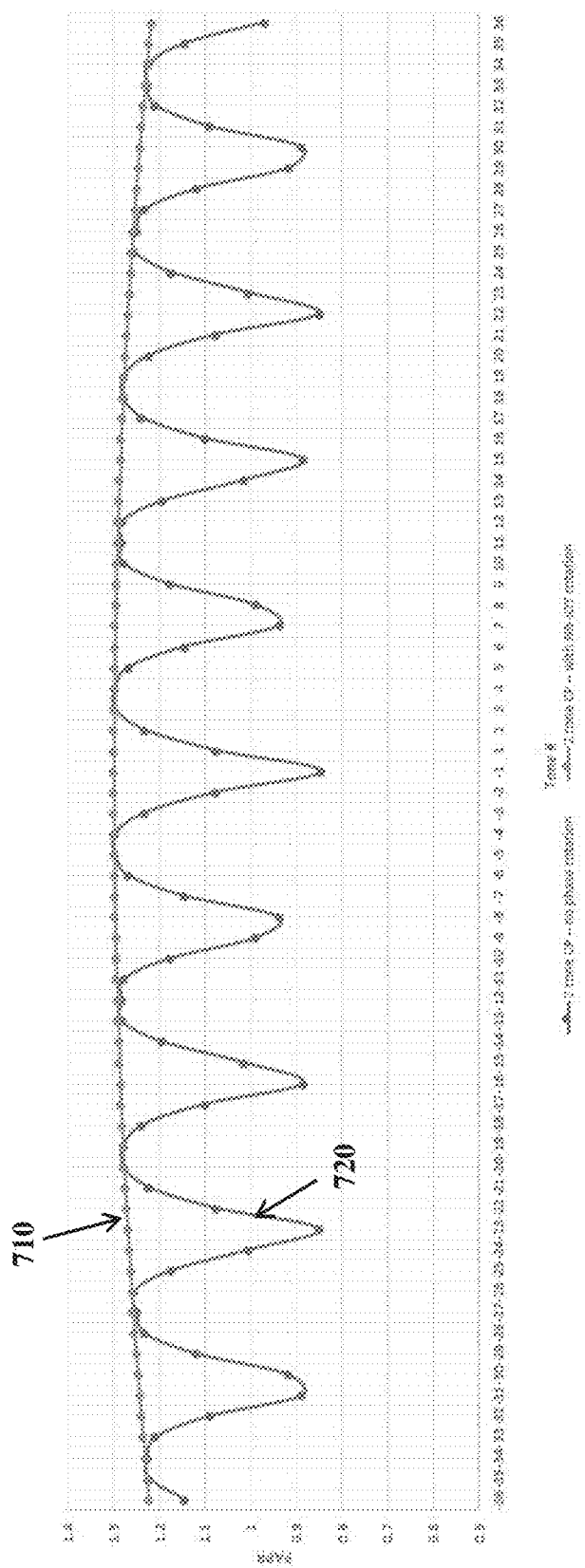
FIG. 7 illustrates PAPR with the CP added to a 2 Sub-carrier Pi/2 BPSK signal, with and without NB-IoT phase rotation, according to embodiments of the present invention.

A similar issue occurs for eMTC with 2 sub-carrier Pi/2 BPSK. Also, in current implementations, eMTC needs to support 72 subcarriers over a wider 1.08 MHz bandwidth. FIG. 7 shows the PAPR (vertical axis) with the CP included, with and without the above NB-IoT phase rotation, over 72 subcarriers (horizontal axis). As illustrated in FIG. 7, the PAPR 720 without any phase rotation adjustment is shown, along with the PAPR 710 resulting from using the same phase rotation approach as NB-IoT. This shows that the NB-IoT approach is not beneficial, or only of marginal benefit. This is because with the eMTC in-phase Pi/2 BPSK, the tones are at different frequencies so the phase rotation needed to reduce PAPR depends on which tone is transmitted.

According to embodiments, the additional phase rotation would be dependent on the tone that was transmitted, for example:

```
if Lower tone sent
    phi+= 2*pi*ToneSpace*(k+0.5)*CPLengthSamples/SamplingRate;
else Upper tone sent
    phi+= 2*pi*ToneSpace*(k+1.5)*CPLengthSamples/SamplingRate;
end
```

Here, Lower tone and Upper tone refer to the two tones/subcarriers k and k+1, respectively. The term phi+ refers to the additional phase rotation, ToneSpace refers to the frequency spacing between tones, k refers to a particular subcarrier index, CPLengthSamples refers to the cyclic prefix length samples and SamplingRate refers to the sampling rate.

However, since this is data dependent it is not immediately evident how the receiver could know a priori which tone is to be transmitted. Therefore decoding is not practical. As such, methods and apparatuses are required which can provide good PAPR when CP is included for 2 tone in-phase Pi/2 BPSK.

According to embodiments of the present invention, there is provided a method for implementing cyclic prefixes in a communication system such as LTE or eMTC. The method includes using only a single phase rotation angle for both sub-carriers (in contrast to current NB-IoT implementations which involve only one sub-carrier). The method includes rotating phase based on the average (e.g. mean) frequency of both sub-carriers.

According to embodiments of the present invention, using the average frequency is not expected to necessarily give perfect Pi/2 transitions at the symbol boundaries but because the two sub-carriers are adjacent, the transitions are much closer to pi/2 than if no phase adjustments are made.

Figure 8:
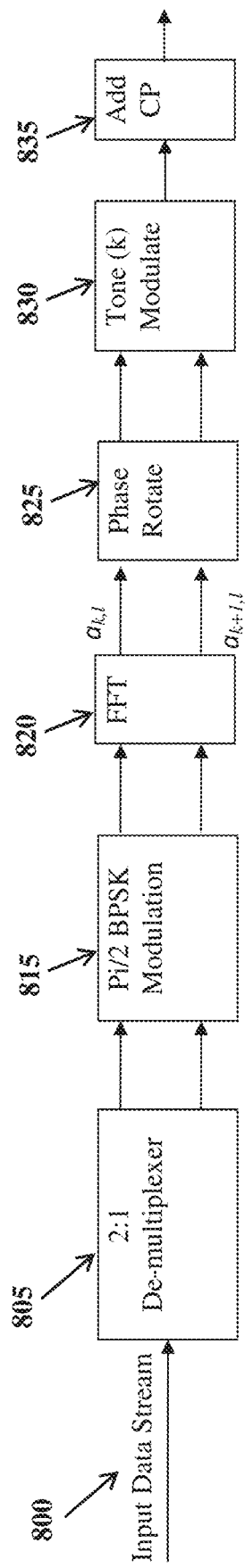
FIG. 8 illustrates a method including using only a single phase rotation angle for both sub-carriers, according to embodiments of the present invention.

FIG. 8 illustrates this method and associated apparatus in accordance to some embodiments of the present invention. It is noted that FIG. 8 can be combined with FIG. 3, 4 or 5, in order to interleave DMRS symbols or precursor data with the binary data or symbols representing same. According to FIG. 8 An input data stream 800 is input to a de-multiplexer 805 which produces two data streams. The two streams can be operated on pairwise (in parallel on a symbol-by-symbol basis) in subsequent operations.

The output of the demulitplexer 805 is provided to a modulator 815 which performs Pi/2 BPSK modulation, thus converting input data into modulation symbols. As previously mentioned, two bits may be modulated at a time (i.e. in parallel) to produce two symbols according to BPSK symbol constellation(s). The BPSK symbol constellation(s) may be rotated by ±Pi/2 radians after conversion of each pair of bits. Each one of the pair of bits may be modulated using a same BPSK symbol constellation, or different ones of the pair of bits may be modulated using different (e.g. rotated by Pi/2 radians relative to one another) BPSK symbol constellations.

Pairs of symbols output by the modulator 815 are subject to a FFT (or DFT) operation 820. The operation 820 outputs a pair of symbols which corresponds to a discrete Fourier transform of the input symbols. Pairs of symbols output by operation 820 may be subject to a phase rotation operation 825. The phase rotation operation performs phase rotations on pairs of symbols in the manner described herein. For example, the same phase rotation can be applied to each one of each pair of symbols that will be transmitted concurrently on each one of the pair of sub-carriers. The phase rotation operates on pairs of symbols in parallel (i.e. the pairs of symbols output by FFT operation 820). The same phase rotation is applied to each of these pairs of symbols operated on in parallel, that is, on pairs of symbols which will be transmitted concurrently on different ones of the pairs of sub-carriers. The phase rotation can incorporate other aspects. For example, the phase rotation can be generated based on an average frequency of the pair of subcarriers subsequently used. A scaling factor may be applied to determine the phase rotations.

Pairs of symbols output of the phase rotation operation 825 are subject to a Tone (k) modulation operation 830. The operation 830 is performed pairwise on phase rotated symbols output by the phase rotation operation in order to map respective ones of each pair of phase rotated symbols to respective ones of the pair of sub-carriers. The operation 830 may comprise sub-carrier mapping, in which tones k and k+1 are mapped to two (typically adjacent) sub-carrier frequencies of the PRB configuration. The operation 830 may be fixed and inherent in the definition of the tones. The operation 830 may be configurable and performed on generalized tones. The operation 830 may map respective ones of each pair of phase rotated symbols to respective ones of the pair of sub-carriers. The operation 830 may map one symbol of an input pair of symbols to a particular sub-carrier, and maps the other symbol of the input pair to another sub-carrier. The mapping is performed according to a predetermined mapping rule.

A cyclic prefix operation 835 may add cyclic prefixes to symbols output of the Tone (k) modulation operation 830. This generates prefixed symbols, as will be readily understood by a worker skilled in the art. Alternatively, cyclic prefixes can be added in another manner. Other operations (not shown) can also be performed, as would be readily understood by the worker skilled in the art, such as digital-to-analog conversion, transmit filtering (e.g. Nyquist reconstruction), radiofrequency (RF) upconversion, additional filtering of harmonics, and power amplification. The prefixed symbols are subsequently transmitted using a pair of sub-carriers of the PRB format.

According to embodiments, the method can be defined mathematically as follows:

For $N_{sc}^{RU}=2$ (i.e. 2 tone), the time-continuous signal $s_{k,l}(t)$ for two tone index k in SC-FDMA symbol l is defined by:

$$s_{k,l}(t)=a_{k,l}\cdot e^{j\phi_{k,l}}\cdot e^{j2\pi(k+1/2)\Delta f(t-N_{CP,l}T_s)}+ a_{k+1,l}\cdot e^{j\phi_{k,l}}\cdot e^{j2\pi(k+3/2)\Delta f(t-N_{CP,l}T_s)} \quad (6)$$

For $0 \leq t < (N_{CP}+N)T_s$, where $\Delta f=15$ kHz, $T_s=30720000$ is sampling frequency, $N_{CP}$ is cycle prefix length, $N=2048$, $k=-36:35$, $a_{k,l}$ is the content of resource element (k,l) (i.e. which is the pi/2 BPSK 2 pt FFT modulation value of symbol l for the lower tone—see FIG. 8 and $a_{k+1,l}$ is the content of resource element (k+1,l) (i.e. resource element of upper tone) and the phase rotation $\phi_{k,l}$ is defined by $$\phi_{k,l} = \begin{cases} 0 & l=0 \\ \varphi_k(l-1) + 2\pi\Delta f(k+1)N_{CP}T_s & l>0 \end{cases} \quad (7)$$

where l is a symbol counter that is reset at the start of a transmission and incremented for each symbol during the transmission. According to some embodiments, the term "(k+1)" in the above phase rotation equation represents the average of the lower tone (k+1/2) and upper tone (k+3/2). Thus, the phase rotation of each of two tones (subcarriers) is the same, and each update is based on the average frequency of the two tones (subcarriers). It should be readily understood that Equation (7) above can be varied in some ways. For example, the term $N_{CP}$ can be replaced with $(N+N_{CP})$.

As shown by Equation (7) above, the same phase rotation for a current pair of symbols may be derived in part based on the same phase rotation for an immediately prior pair of symbols plus an offset incorporating the average frequency of the pair of sub-carriers.

Figure 9:
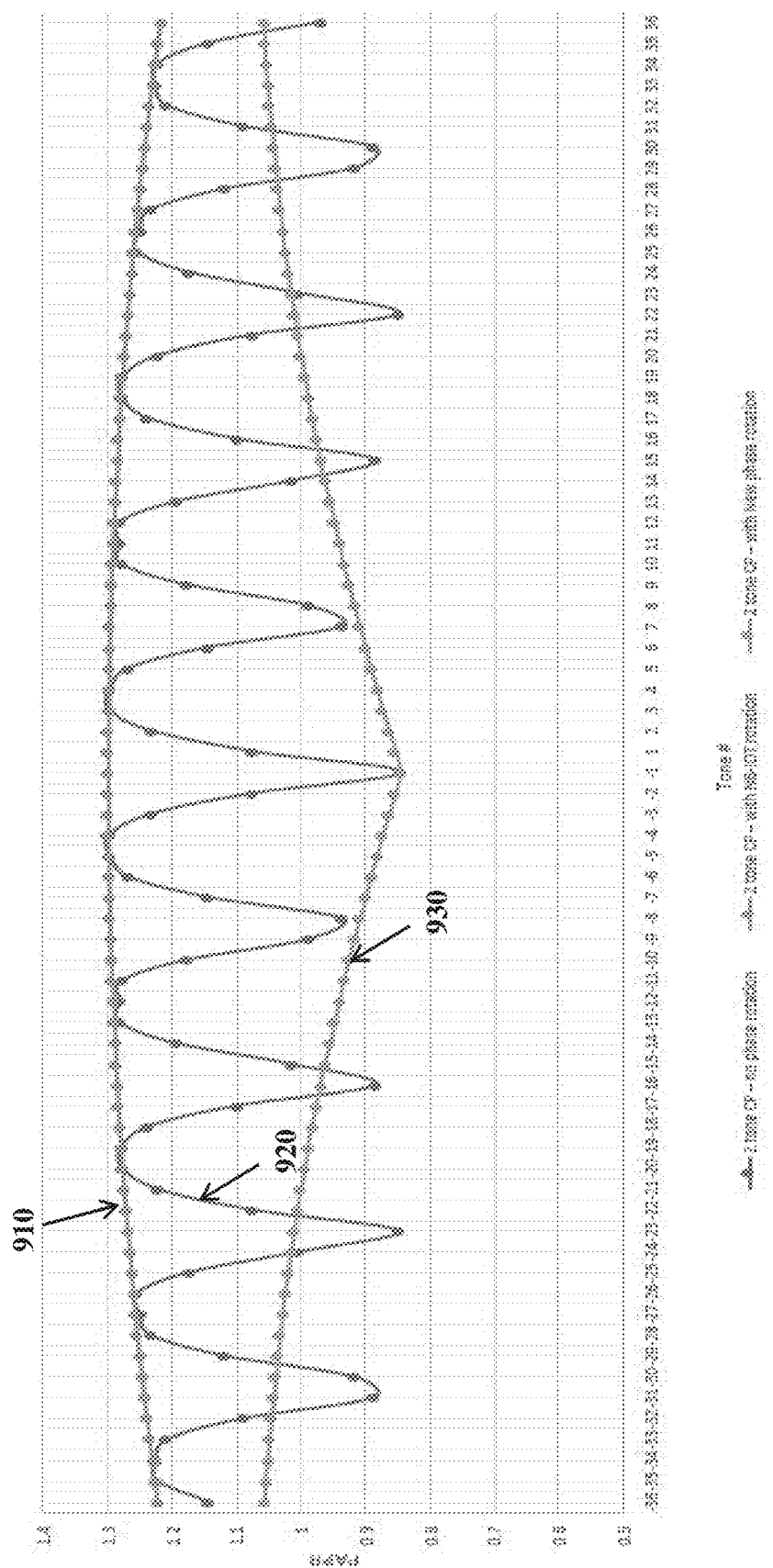
FIG. 9 illustrates illustrated the PAPR for the method illustrated in FIG. 8.

FIG. 9 illustrates the PAPR (vertical axis) for the above method. The PAPR is plotted for 72 different tones (horizontal axis). As seen from above, the "new" (i.e. as proposed herein) phase rotation is an improvement over the NB-IoT method especially for the center sub-carriers (or Tone #'s). In more detail, curve 910 illustrates PAPR where phase rotation is applied as proposed in the prior NB-IoT method. Curve 920 illustrates PAPR without phase rotation. Curve 930 illustrates PAPR where phase rotation is applied in accordance with an embodiment of the present invention.

According to embodiments, user equipment (UE) implementation-based improvements can include re-tuning center frequency and including a scaling factor within an updating term for recursively generating a phase rotation value.

According to embodiments, for sub-carriers farther from the center frequency ($f_c$), the PAPR generally increases. This is due to the transmit filter or reconstruction filter effects. A half duplex frequency division duplexing (HD-FDD) eMTC UE has a 1 ms receive-transmit (RX-TX) re-tune gap which provides enough time for the UE to re-tune its local oscillator (i.e. $f_c$) to avoid these negative PAPR affects of the transmit filter to allow for generating the tone pair at the center of this plot. However, if frequency hopping within the 1.08 MHz bandwidth in FDD is used then this technique may not be possible as there would likely not be enough time to re-tune the local oscillator between hops.

Figure 10:
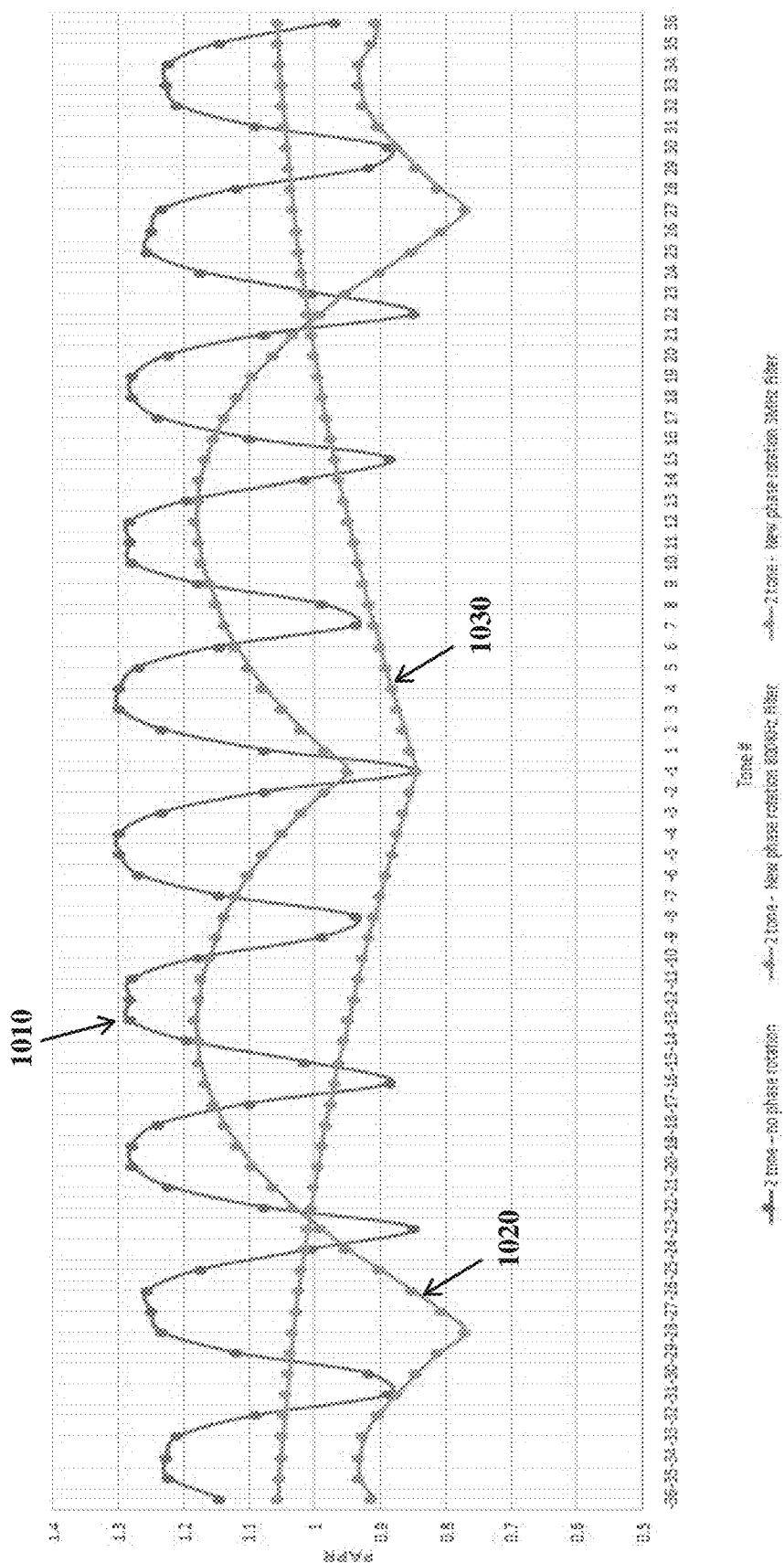
FIG. 10 illustrates a PAPR variation effect according to embodiments of the present invention.

According to embodiments, as seen from FIG. 9, the PAPR is worse for the sub-carriers away from the center. Given that the sample rate may be 1.92 MHz, a filter that cuts off at 3 MHz does not sufficiently suppress sampling images in adjacent frequencies. As seen in FIG. 10, this PAPR variation effect is more pronounced when the transmit filter cut-off is reduced to a more practical 800 KHz from 3 MHz. The increase in PAPR is due to the fact that the +pi/2 transitions (i.e. forward transition) do not have the same PAPR as the −pi/2 transition (i.e. reverse transition) due to the transmit filtering affects. In more detail, FIG. 10 illustrates the PAPR (vertical axis), plotted for 72 different tones (horizontal axis). Curve 1010 illustrates PAPR without phase rotation. Curve 1020 illustrates PAPR where phase rotation is applied in accordance with an embodiment of the present invention, and with a transmit filter cut-off frequency of 800 kHz. Curve 1030 illustrates PAPR where phase rotation is applied in accordance with an embodiment of the present invention, and with a transmit filter cut-off frequency of 3 MHz.

In more detail, the pi/2 BPSK modulation on its own advances or retards the phase. Without the addition of the cyclic prefixes, these phase transitions occur on the symbol boundaries. Filtering is performed to mitigate sudden discontinuities or jumps in waveforms at these symbol boundaries. The cyclic prefix extends the symbol by adding additional rotation that substantially randomizes the finishing phase of one symbol relative to the beginning of the next symbol. Embodiments of the present invention mitigate this unpredictable and potentially detrimental phase discontinuity by resetting it to a more consistently lower phase discontinuity.

Figure 11:
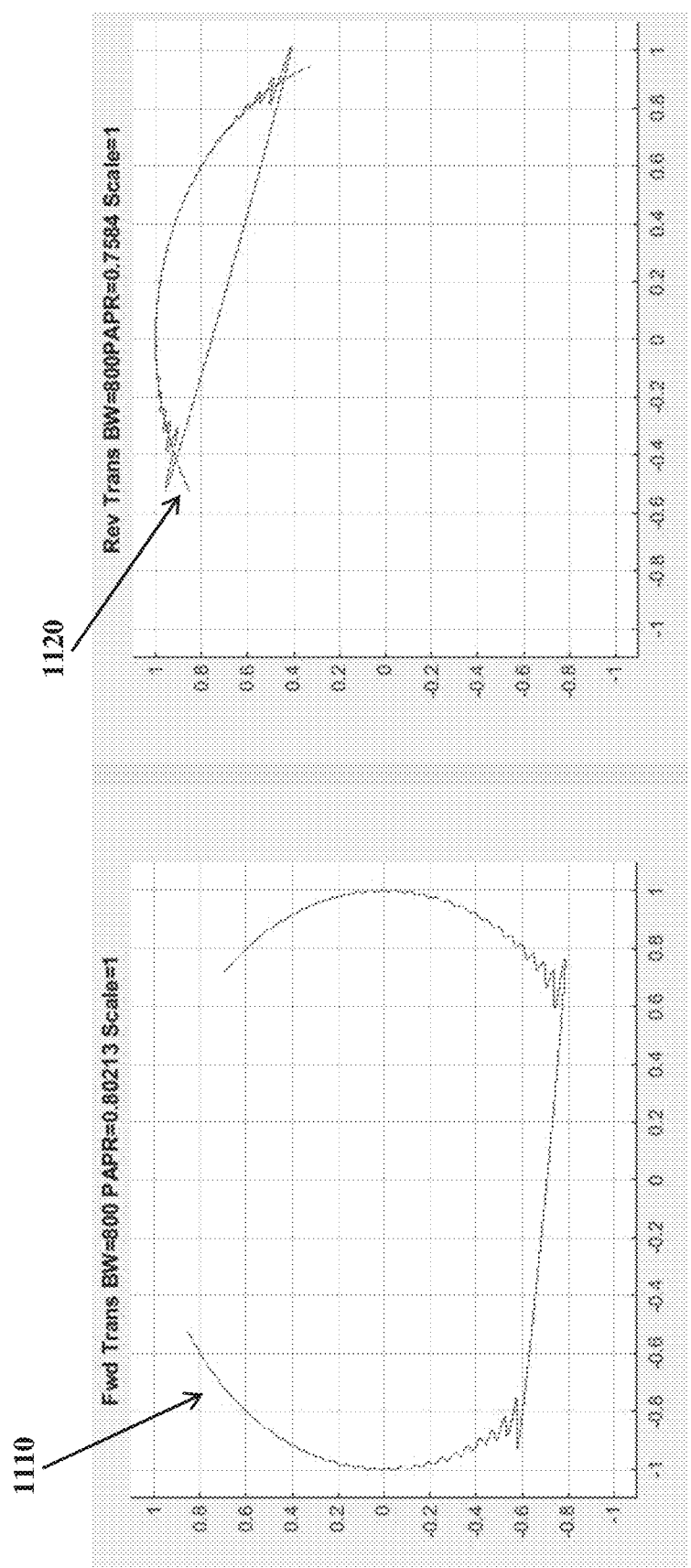
FIG. 11 illustrates eye diagrams for forward and reverse transition for sub-carrier k=0 when PAPR is good, according to embodiments of the present invention.

FIG. 11 illustrates the eye diagrams for forward (1110) and reverse (1120) transitions for sub-carrier k=0 where PAPR is good. This sub-carrier is far below the filter cut-off and the PAPR is fairly similar for both transitions.

Figure 12:
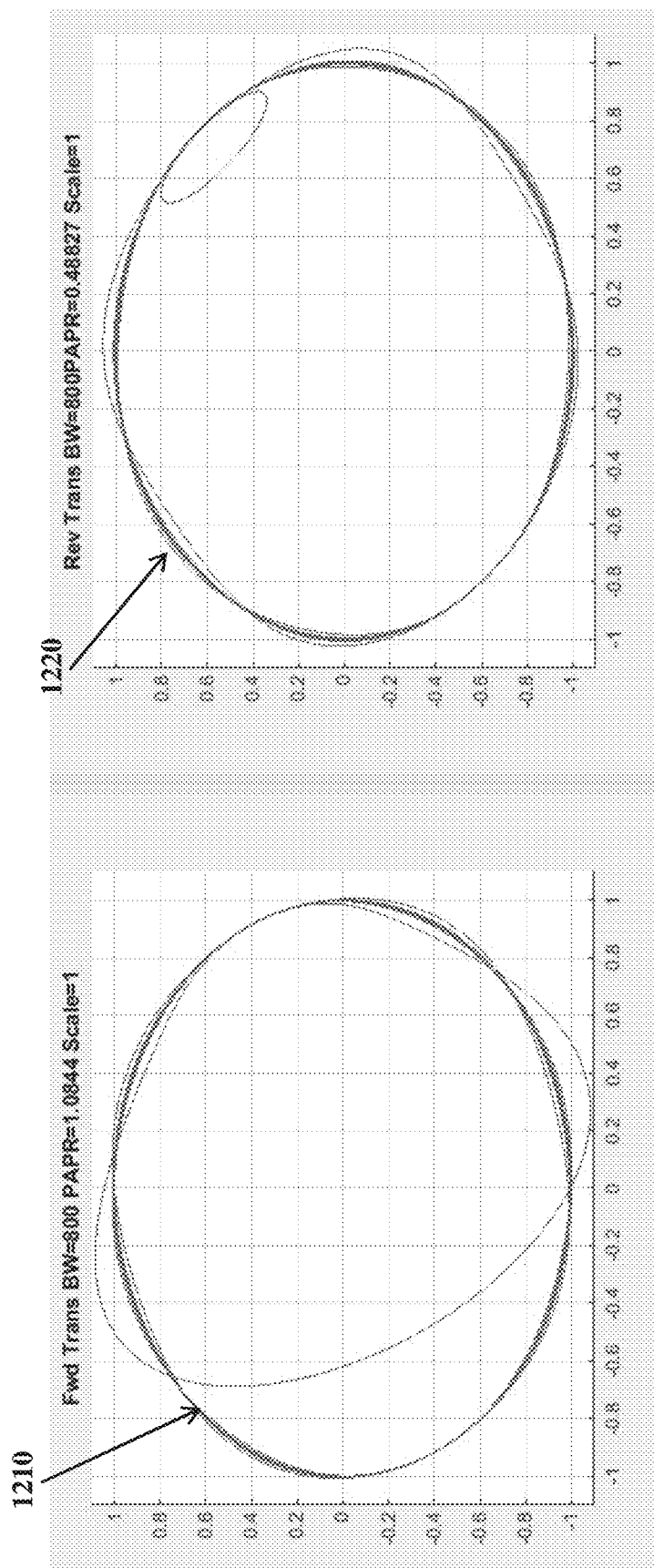
FIG. 12 illustrates eye diagrams for forward and reverse transition for sub-carrier k=14 when PAPR is bad, according to embodiments of the present invention.

FIG. 12 illustrates the eye diagrams for forward (1210) and reverse (1220) transition for sub-carrier k=14 where PAPR is bad. This sub-carrier is close to the filter cut-off. We see that the PAPR is different for both transitions and the resulting PAPR will have a higher number. In particular, the forward transition results in bigger excursions above the average than the reverse transition which causes most of the increased PAPR.

In more detail, PAPR can be undesirably bad due to larger than a predetermined amount of amplitude variation, which contributes to the PAPR. Ideally there would be no such variation, so lower amplitude variation is considered better. Short transitions outside (above) the average circle (referring to the eye diagrams) can be particularly problematic because ideally the amplifier should be operated with its peak output close to its average output. If this is achieved and then a signal significantly above the average is input to the amplifier, clipping and hence signal distortion can occur. Embodiments of the present invention can be implemented to mitigate such a situation.

According to embodiments, a solution to this problem is to add a scaling factor (SF) to the equation phase rotation equation defined below.

$$\phi_{k,l} = \begin{cases} 0 & l = 0 \\ \varphi_k(l-1) + SF * 2\pi\Delta f(k+1)N_{CP,l}T_s & l > 0 \end{cases} \quad (8)$$

Figure 13:
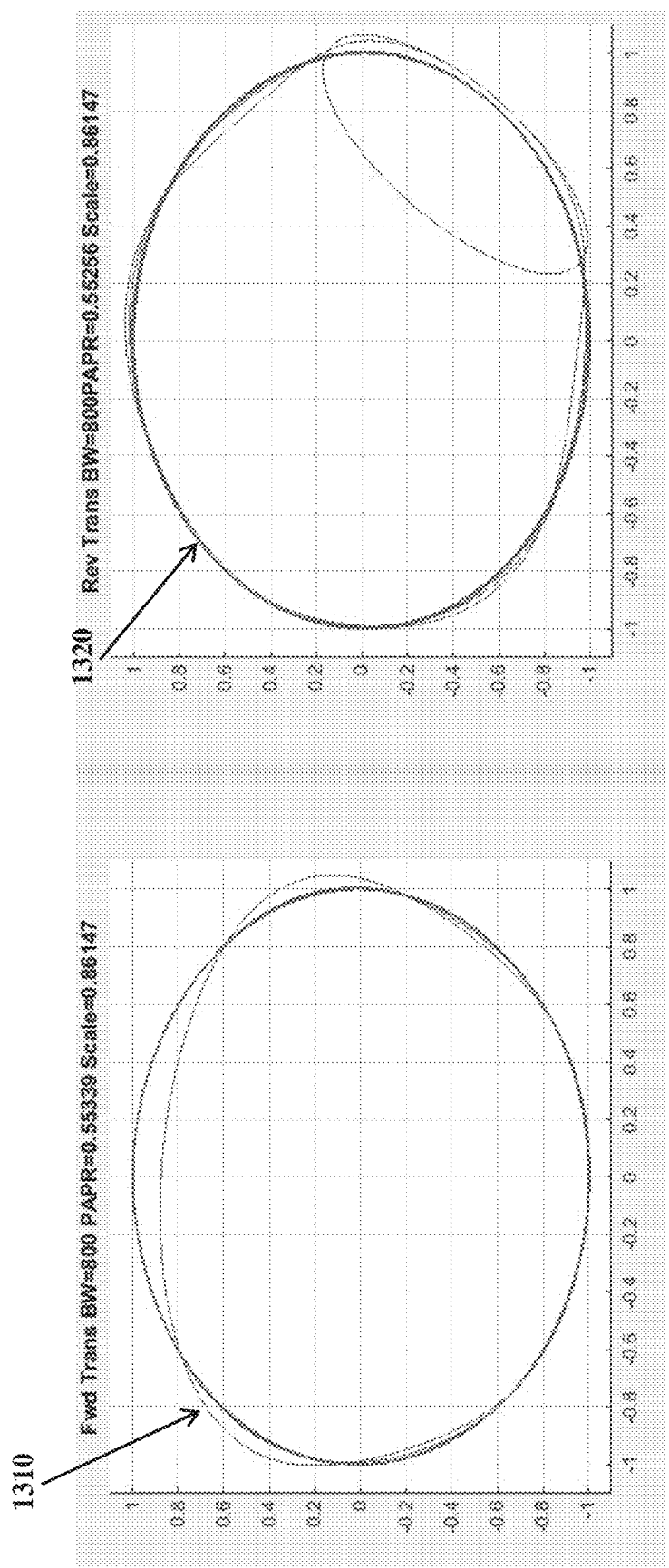
FIG. 13 illustrates eye diagrams wherein the SF is optimized for each sub-carrier to balance the PAPR for the forward and reverse transitions, according to embodiments of the present invention.

As seen in Equation (8), the current phase rotation is derived from a prior phase rotation plus an offset term, where the offset term is multiplied by a scaling factor SF. The SF changes the phase rotation to balance the PAPR for the forward and reverse transitions. The SF may depend on characteristics of the transmit filter used in transmitting the prefixed symbols. The UE may be configured to determine a-priori a SF for each subcarrier index k to use, based on the transmit filter it will use. As mentioned, one possible method to optimize the SF for each sub-carrier is to balance the PAPR for the forward and reverse transitions. Using this approach with a 800 kHz transmit filter, a scaling factor of 0.86 was determined for subcarrier k=14 where the eye diagrams for forward (1310) and reverse (1320) transitions are illustrated (with scaling factor applied) in FIG. 13. Where the PAPR is reduced from 1.08 to 0.55 dB. The resulting phase changes between the end of the CP and the start of the next symbol when applying the SF will not typically be + or −Pi/2. The scaling factor may thus be configured to balance a peak-to-average power ratio for forward and reverse phase transitions.

Figure 14:
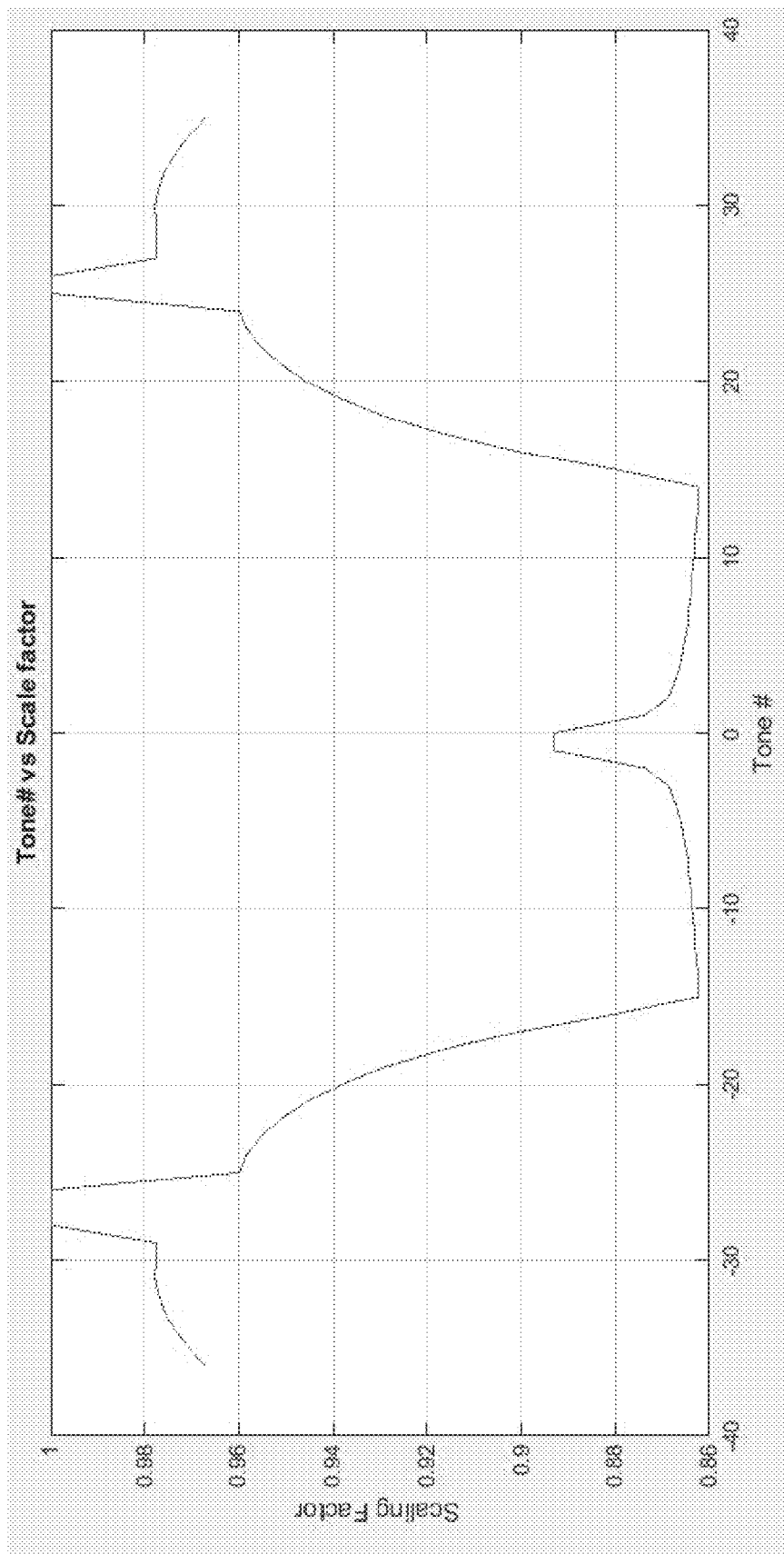
FIG. 14 illustrates SF that were determined for possible sub-carriers, according to embodiments of the present invention.
Figure 15:
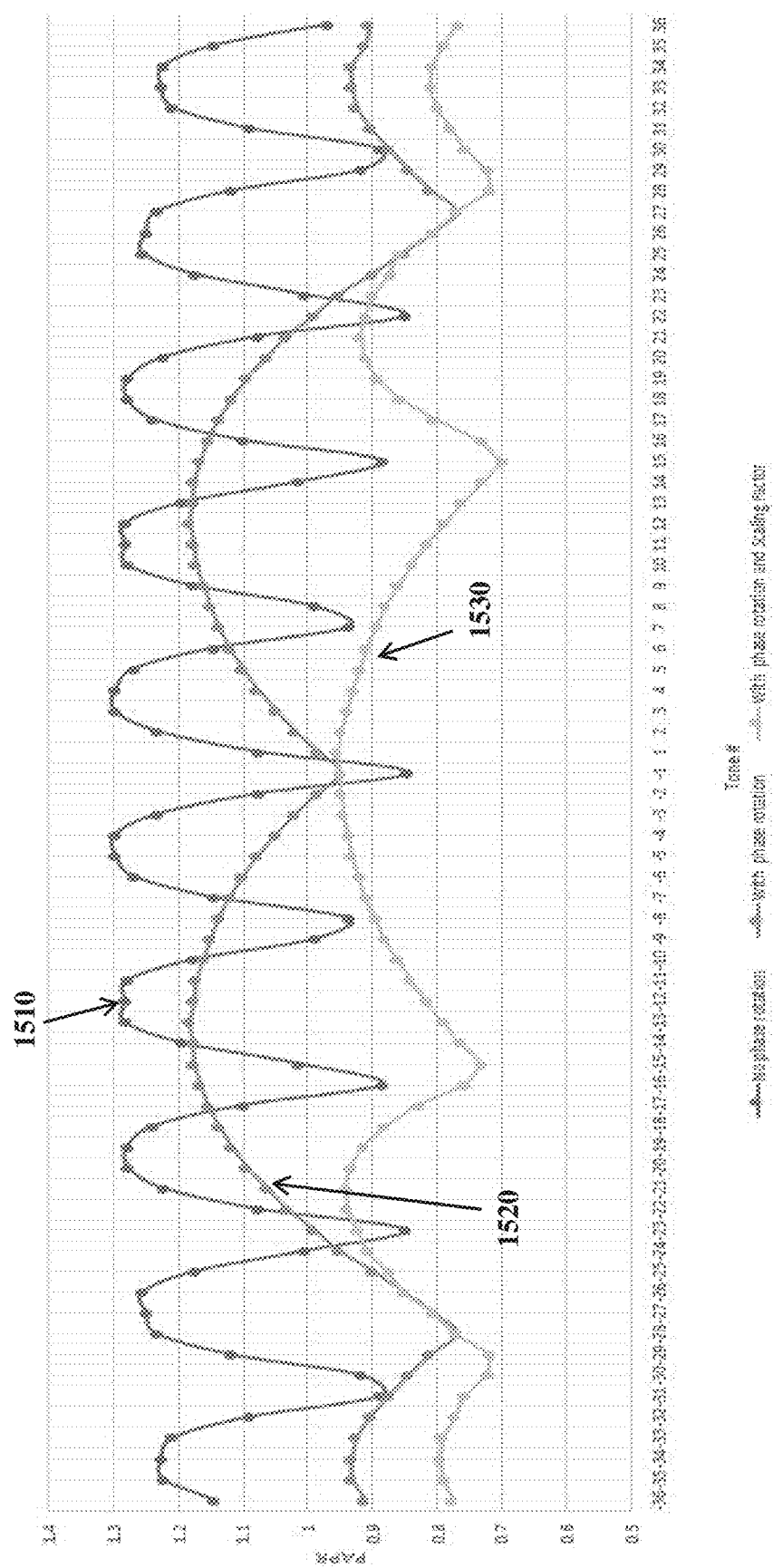
FIG. 15 illustrates the PAPR using the SF as determined according to FIG. 14.

According to embodiments, using the above approach with the 800 kHz filter, the SFs determined for all possible sub-carriers, are as illustrated in FIG. 14. The PAPR using the scaling factors defined in FIG. 14 (as well as phase rotation) is the bottom curve 1530 illustrated in FIG. 15. For comparison, the PAPR using phase rotation but no scaling factor is shown as curve 1520, and the PAPR without phase rotation is shown as curve 1510. The vertical axis is PAPR and the horizontal axis shows the 72 tones. As seen from the above, using a scaling factor to adjust the phase rotation can improve the PAPR for the worst case sub-carriers with very little degradation for the best.

According to embodiments, although the base station may not necessarily know what scaling factor the UE will use, as long as the scaling factor is small the base station may see this as a small phase error. The phase error will only be on the CP portion since the scaling factor (SF) is applied only to the CP and the CP is typically ~6.6% (4.7 us of 71 us). For example, if SF=0.8 then the total phase error is (1−0.8)*7.6%=1.3% which would only cause a very small degradation in detection or BLER performance.

According to embodiments, there is provided methods and apparatuses for an OFDMA system, SC-FDMA, 2 sub-carrier pi/2 BPSK with cyclic prefix added wherein phase rotation is used to compensate for CP rotation. According to some embodiments, the same phase rotation is applied to both sub-carriers. According to some embodiments phase rotation is based on the average frequency of the two sub-carriers.

According to some embodiments, the transmitter may retune the local oscillator (i.e. $f_c$) if the transmitted sub-carrier is too close to the cut-off of the transmit (or reconstruction) filter. For example, the transmitter may be configured to determine if a frequency of one of the pair of sub-carriers is within a predetermined range of a cut-off frequency of a transmit filter used in transmission of the prefixed symbols or reconstruction filter involved in reception of the prefixed symbols. When the frequency is within the predetermined range, the transmitter may re-tune a local oscillator generating frequencies of the sub-carriers.

According to some embodiments, the methods include applying a sub-carrier dependent scaling factor to the phase rotation. In some embodiments, the scaling factor can be determined a-priori based on the effects of transmit filters. In some embodiments, the scaling factor can be determined a-priori by equalizing the PAPR for the forward and reverse phase transitions.

Embodiments of the present invention can be used for wireless (i.e. radio) communication in an OFDMA communication system, for example operating according to the LTE standard. Embodiments of the present invention can be used for communication in an SC-FDMA system, for example operating according to the LTE standard. Embodiments of the present invention comprise signal modulation using a two-tone Sub-PRB scheme, as described above. Embodiments of the present invention further comprise signal modulation using a pi/2 BPSK scheme, in conjunction with the two-tone scheme. Embodiments of the present invention further comprise this two-tone pi/2 BPSK signal modulation in the in-phase manner as described above.

It should be noted that embodiments of the present invention can be varied in several ways. For example, performing a discrete Fourier transform pairwise on modulation symbols can be combined with the preceding modulation operation by causing the modulation operation to map input data to symbols in a manner that, in a single step, produces the same output symbols as the two-step Pi/2 BPSK modulation followed by the discrete Fourier transform operation. Other operations can be similarly combined. Some operations can be omitted when not required. For example, phase rotation can be omitted in some embodiments which involve alternatingly transmitting DMRS symbols on different ones of a pair of sub-carriers. As another example, an explicit tone (k) modulation operation can be omitted if the two tones are always mapped to the same pair of sub-carriers, in which case the pairs of symbols output e.g. from phase rotation or discrete Fourier transform may be provided directly for use in modulating the pair of sub-carriers.

Embodiments of the present invention provide for a method for transmitting data, for example wirelessly, using a modulation scheme as described above. The method can be implemented on an electronic device having wireless communication capability. The device can include at least a source of data to be transmitted, an antenna, and electronics for generating the modulated signal for transmission by the antenna based on the sourced data. The electronics can be in the form of an application specific integrated circuit, field programmable gate array, signal processor, microcontroller, processor coupled to memory, or the like, or a combination thereof.

Embodiments of the present invention provide for an apparatus for transmitting data, for example wirelessly, using a modulation scheme as described above. The apparatus can be an electronic device such as that described above, or a portion thereof, such as an electronic component having the described functionality.

Embodiments of the present invention provide for a method and apparatus for receiving and processing data transmitted in the manner described above. The method can be implemented on, and the apparatus can be, an electronic device having wireless communication to ability, as described above, or a portion of such an electronic device.

Figure 16:
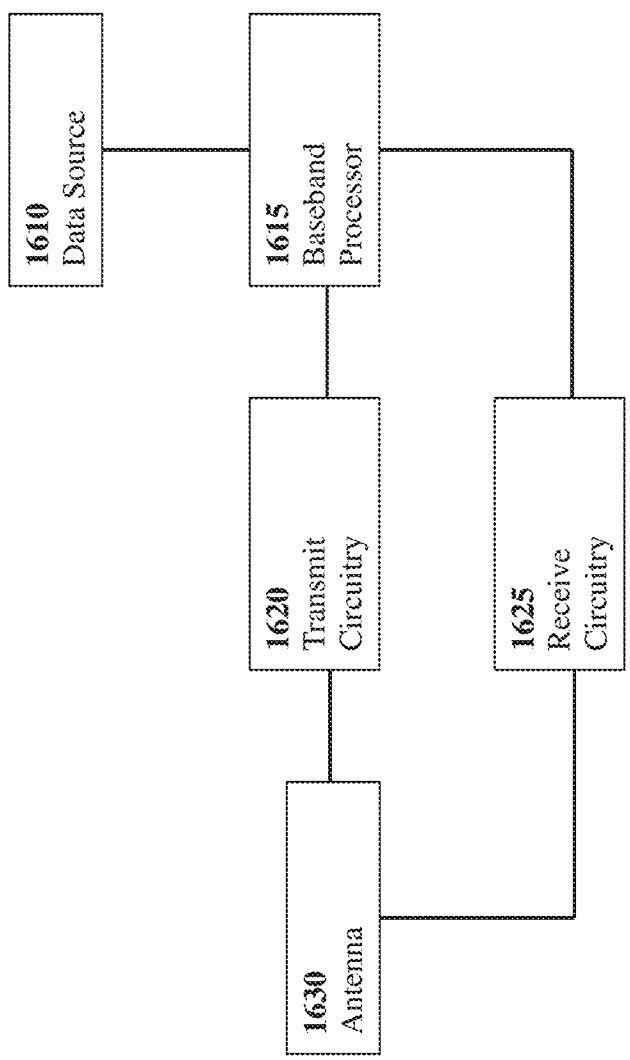
FIG. 16 illustrates an apparatus provided according an embodiment of to the present invention.

FIG. 16 illustrates an apparatus provided according an embodiment of the present invention. The apparatus includes a source of data 1610, a baseband processor 1615, transmit circuitry 1620, receive circuitry 1625, and an antenna 1630. The source of data 1610 a baseband processor 1615, transmit circuitry 1620 and receive circuitry 1625 can be provided using various electronic components, including baseband (e.g. processor, FPGA, ASIC, etc.) and/or RF components, as would be readily understood by a worker skilled in the art.

It will be appreciated that, although specific embodiments of the technology have been described herein for purposes of illustration, various modifications may be made without departing from the spirit and scope of the technology. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on a computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the scope of the invention, and all such modifications as would be obvious to one skilled in the art are intended to be included within the scope of the following claims.

We claim:

1. A method for transmitting symbols in a physical resource block format in a communication system, the method comprising:
    converting input data into modulation symbols, the converting comprising performing Pi/2 binary phase shift keying (BPSK) modulation on the input data;
    performing a discrete Fourier transform pairwise on the modulation symbols, or on the modulation symbols combined with additional modulation symbols;
    performing a phase rotation operation on symbols output by the discrete Fourier transform;
    performing tone (k) modulation pairwise on phase rotated symbols output by the phase rotation operation in order to map respective ones of each pair of phase rotated symbols to respective ones of the pair of sub-carriers;
    adding cyclic prefixes to symbols output by the tone (k) modulation to generate a plurality of prefixed symbols; and
    transmitting the prefixed symbols using a pair of sub-carriers of the physical resource block format,
    wherein the phase rotation operation comprises applying a same phase rotation to pairs of symbols that will be transmitted concurrently on each one of the pair of sub-carriers.

2. The method of claim 1, wherein the same phase rotation is generated based on an average frequency of the pair of sub-carriers.

3. The method of claim 1, wherein the same phase rotation for a current pair of symbols is derived in part based on the same phase rotation for an immediately prior pair of symbols plus an offset incorporating the average frequency of the pair of sub-carriers.

4. The method of claim 3, further comprising multiplying the offset by a scaling factor.

5. The method of claim 4, wherein the scaling factor is based on characteristics of a transmit filter used in transmitting of the prefixed symbols.

6. The method of claim 4, wherein the scaling factor is configured to balance a peak-to-average power ratio for forward and reverse phase transitions.

7. The method of claim 1, wherein the phase rotation is configured to compensate for cyclic prefix rotation.

8. The method of claim 1, further comprising:
    determining if a frequency of one of the pair of sub-carriers is within a predetermined range of a cut-off frequency of a transmit filter used in transmission of the prefixed symbols or reconstruction filter involved in reception of the prefixed symbols;
    when the frequency is within the predetermined range, re-tuning a local oscillator generating frequencies of the sub-carriers.

9. The method of claim 1, wherein the pair of sub-carriers are adjacent sub-carriers in the physical resource block format.

10. The method of claim 1, wherein the physical resource block format comprises the pair of sub-carriers as well as additional sub-carriers, and wherein the additional sub-carriers are unused for transmission.

11. An electronic wireless communication apparatus for transmitting symbols in a physical resource block format in a communication system, the apparatus comprising circuitry configured to:
    convert input data into modulation symbols, the converting comprising performing Pi/2 binary phase shift keying (BPSK) modulation on the input data;
    perform a discrete Fourier transform pairwise on the modulation symbols, or on the modulation symbols combined with additional modulation symbols;
    perform a phase rotation operation on symbols output by the discrete Fourier transform;
    perform tone (k) modulation pairwise on phase rotated symbols output by the phase rotation operation in order to map respective ones of each pair of phase rotated symbols to respective ones of the pair of sub-carriers;
    add cyclic prefixes to symbols output by the tone (k) modulation to generate a plurality of prefixed symbols; and
    transmit the prefixed symbols using a pair of sub-carriers of the physical resource block format,
    wherein the phase rotation operation comprises applying a same phase rotation to pairs of symbols that will be transmitted concurrently on each one of the pair of sub-carriers.

12. The apparatus of claim 11, wherein the same phase rotation is generated based on an average frequency of the pair of sub-carriers.

13. The apparatus of claim 11, wherein the same phase rotation for a current pair of symbols is derived in part based on the same phase rotation for an immediately prior pair of symbols plus an offset incorporating the average frequency of the pair of sub-carriers.

14. The apparatus of claim 13, further comprising multiplying the offset by a scaling factor.

15. The apparatus of claim 14, wherein the scaling factor is based on characteristics of a transmit filter used in transmitting of the prefixed symbols.

16. The apparatus of claim 14, wherein the scaling factor is configured to balance a peak-to-average power ratio for forward and reverse phase transitions.

17. The apparatus of claim 11, wherein the phase rotation is configured to compensate for cyclic prefix rotation.

18. The apparatus of claim 11, further comprising:
    determining if a frequency of one of the pair of sub-carriers is within a predetermined range of a cut-off frequency of a transmit filter used in transmission of the prefixed symbols or reconstruction filter involved in reception of the prefixed symbols;
    when the frequency is within the predetermined range, re-tuning a local oscillator generating frequencies of the sub-carriers.

19. The apparatus of claim 11, wherein the pair of sub-carriers are adjacent sub-carriers in the physical resource block format.

20. The apparatus of claim 11, wherein the physical resource block format comprises the pair of sub-carriers as well as additional sub-carriers, and wherein the additional sub-carriers are unused for transmission.

* * * * *